(12) United States Patent
Cardiff (10) Patent No.: US 10,537,851 B2
(45) Date of Patent: Jan. 21, 2020

(54) FLUE GAS CARBON AND HEAT CAPTURE AND RECIRCULATION SYSTEM

(71) Applicant: CleanO2 Carbon Capture Technologies Inc., Calgary (CA)

(72) Inventor: Jaeson Cardiff, Calgary (CA)

(\*) Notice: Subject to any disclaimer, the term of this patent is extended or adjusted under 35 U.S.C. 154(b) by 0 days.

(21) Appl. No.: 15/928,741

(22) Filed: Mar. 22, 2018

(65) Prior Publication Data
US 2018/0272277 A1 Sep. 27, 2018

Related U.S. Application Data (60) Provisional application No. 62/475,400, filed on Mar. 23, 2017.

(51) Int. Cl.
*B01D 53/83* (2006.01)
*B01D 53/62* (2006.01)
*B01D 53/34* (2006.01)

(52) U.S. Cl.
CPC ........... *B01D 53/83* (2013.01); *B01D 53/343* (2013.01); *B01D 53/62* (2013.01); *B01D 2251/304* (2013.01); *B01D 2251/306* (2013.01); *B01D 2251/402* (2013.01); *B01D 2251/404* (2013.01); *B01D 2251/604* (2013.01); *B01D 2257/504* (2013.01); *B01D 2258/0283* (2013.01)

(58) Field of Classification Search
CPC ............. B01D 53/83; B01D 2257/504; B01D 53/343; B01D 53/62; B01D 53/82; B01D 2251/604; B01D 2258/0283; Y02C 10/08; Y02C 10/04; Y02E 20/326; Y02A 50/2342; F28D 21/0003; F28D 21/001; F28D 2021/0022; F28D 2021/0024; B01J 8/087; B01J 8/10; B01J 8/1836; B01J 2219/00074

See application file for complete search history.

(56) References Cited

U.S. PATENT DOCUMENTS

| | | | |
|---|---|---|---|
| 4,350,662 A | | 9/1982 | Dowgul et al. |
| 4,786,294 A | * | 11/1988 | Jonqueres ............... B01D 53/04 423/228 |
| 8,715,401 B2 | * | 5/2014 | Baxter ..................... B01D 7/02 96/150 |
| 8,975,464 B2 | * | 3/2015 | Jamal ..................... B01D 53/04 585/824 |
| 9,174,844 B2 | * | 11/2015 | Ramkumar ............ B01D 53/10 |

FOREIGN PATENT DOCUMENTS

| | | | | |
|---|---|---|---|---|
| GB | 2 527 608 B | * | 8/2016 | .......... B01D 53/343 |
| WO | 2008113061 A1 | | 9/2008 | |
| WO | 2012145303 A2 | | 10/2012 | |

OTHER PUBLICATIONS

European Patent Application No. 18163267.0, Extended European Search Report dated Jul. 4, 2018.

\* cited by examiner

*Primary Examiner* — Timothy C Vanoy (57) ABSTRACT

A method and apparatus to capture carbon dioxide from combustion products in a flue gas, using replenishable anhydrous metal hydroxides, and capturing heat from an exothermic reaction of the carbon dioxide with the anhydrous metal hydroxides re-use in another heat using system.

11 Claims, 7 Drawing Sheets

FLUE GAS CARBON AND HEAT CAPTURE AND RECIRCULATION SYSTEM

CROSS-REFERENCE TO RELATED APPLICATIONS

This application claims the benefit of priority of U.S. Provisional Patent Application No. 62/475,400, filed Mar. 23, 2017, which is hereby incorporated by reference.

FIELD

The present disclosure relates to the field of carbon capture and heat recovery. More specifically, the present disclosure relates to contacting a $CO_2$ containing flue gas stream with an anhydrous metal hydroxide in an exothermic reaction to provide heat and a carbonate. The heat may be captured for re-use in another system, and the carbonate may be collected as a useful by-product.

BACKGROUND

Greenhouse gas emissions, such as $CO_2$, from the heating industry account for about 20 percent of Canada's total $CO_2$ output.

SUMMARY

It is an object of the present disclosure to obviate or mitigate at least one disadvantage of previous carbon capture and heat recovery systems.

A replenishable anhydrous metal hydroxide is reacted with $CO_2$ from a flue gas, for example from a hydrocarbon fueled heating device, such as a boiler, furnace, or hot water heater, in an exothermic reaction to produce heat and a carbonate, and capturing the heat for re-use in another system, such as heating air and/or heating water for domestic, industrial or commercial use, and providing the carbonate as a useful by-product.

The disclosed technology works by drawing in a portion of the flue gases from any natural gas fired heating appliance. The gas; largely comprising carbon dioxide, is drawn through a main holding chamber where the carbon dioxide reacts with an anhydrous metal hydroxide (for example sodium hydroxide or potassium hydroxide). The byproduct of this reaction is a respective carbonate, water and exothermic heat. The carbonate is left in the main reaction chamber until is it dry and ready for removal by means of a vacuum. The heat is combined with the waste heat from the initial gas fired appliance and is drawn through an upper chamber where an air to water heat exchanger recovers up to 80% of the heat and stores it in an insulated tank located inside the lower section of the unit.

The remaining heat and flue gases return to the flue, downstream of the initial point of contact to the vent. A fan or blower may be used to enhance the flow. In an embodiment disclosed, the fan or blower includes a 55 cfm or otherwise sized fan induction system. Care is taken to ensure that the fan does not exceed the working parameters of the convection created through the combustion process of the initial gas fired appliance. The entire system is sealed and interlocked with the attached appliance to ensure that no flue gases may leave the unit.

The apparatus may be operatively connected with the flue of any equipment that burns hydrocarbons such as natural gas. The flue stream is partially diverted to be drawn into a chamber comprising of anhydrous metal hydroxide. The anhydrous metal hydroxide and the carbon dioxide in the flue gases react to create a carbonate by-product which may have commercial value.

Further to this, the reaction also creates heat from the exothermic reaction of the process. The heat is then combined with the waste heat from the initial appliance and then passes into an adjacent chamber housing a heat exchanger. The heat exchanger utilizes this waste heat by transferring it into a buffer tank located in the capture device. This heat is then stored for use to either pre-heat a domestic hot water tank or could be used in a fan coil to provide a heat source in a forced air heating appliance or other use.

The remaining flue gases are returned to the flue they were extracted from by means of a flue inducer (fan). This process repeats each time the fossil fuel fired equipment enters its heating cycle.

This disclosure provides, in an embodiment, a method of operation and a carbon dioxide capture and heat recycle apparatus for attachment to a flue of a furnace or similar equipment, the apparatus comprising:
 (a) Diverter means to switchably divert combustion gas from the flue;
 (b) A first conduit to receive diverted flue gas from the flue;
 (c) A process chamber operatively connected to the first conduit, the process chamber comprising:
  i. A drum to hold dry particulate process chemicals through which diverted flue gas may be flowed;
  ii. Stirring means to stir the process chemicals to ensure that the flue gas contacts the surface of the particulate chemicals;
  iii. Means to insert new particulate process chemicals into the drum, and means to remove spent or old particulate process chemicals from the drum;
  iv. Means to power the stirring means to rotate or stir;
  v. Heat exchanger means to collect heat energy from the process chamber in a heat carrier material;
 (d) A second conduit to carry chemically affected flue gas from the process chamber back to the flue;
 (e) A controlled fan or similar equipment to force chemically affected flue gas from the second conduit back into the flue, mounted inline in the second conduit;
 (f) A heat storage means with associated heat exchanger to collect and store heat from the heat carrier material.

In an embodiment, the particular process chemical is caustic beads.

In an embodiment, the caustic beads are of NaOH and the spent process materials are $Na_2CO_3$, and water is a byproduct of the reaction between the $CO_2$ in the flue gas and the $Na_2CO_3$ of the process chemicals.

In an embodiment, the process chamber is a drum, and the stirring means is a rotating paddle device and the stirring device is powered by an electric motor with transmission such as gears or pulleys.

In an embodiment, the heat exchanger means is a fin or tube type heat exchanger in or next to the second conduit which may include a chamber above or within the top portion of the process chamber, and the heat carrier material is an suitable fluid.

In an embodiment, the heat storage means is a tank for receiving heated carrier material which is a fluid.

In an embodiment, the fan is controlled to ensure that the pressure inside the process chamber and conduits is lower than ambient pressures outside the apparatus.

In an embodiment, the fan is controlled to offset any reduction in convection forces induced by the apparatus or flue gas flow exiting into the first conduit, to ensure that the flue and associated chimney draw flue gas to atmosphere adequately, as well as to induce flue gas velocity upstream of the second conduit to encourage flue gas with reduced dew point due to energy harvested by the system and moisture added by the chemical processes in the system, to exit the associated chimney without harming the flue or chimney or associated equipment.

In an embodiment, the heat stored in the heat storage means may be used to heat domestic water supplies or HVAC or domestic heating equipment.

In a first aspect, the present disclosure provides a carbon dioxide capture and heat recycle apparatus adapted to receive a flue gas containing $CO_2$, the apparatus including a reaction chamber adapted to receive the flue gas, the reaction chamber including a drum to hold a dry particulate process chemical through which the flue gas may be flowed, an agitator to agitate the process chemicals to ensure that the flue gas contacts the surface of the particulate process chemicals, means to insert new particulate process chemicals into the drum, and means to remove spent or old particulate process chemicals from the drum, a heat exchanger to collect heat energy from the reaction chamber in a heat carrier material, and a heat storage means to collect and store heat from the heat carrier material.

In an embodiment disclosed, the apparatus further includes diverter means to switchably divert the flue gas from a flue to the reaction chamber, a first conduit to receive diverted flue gas from the flue, a second conduit to carry chemically affected flue gas from the reaction chamber back to the flue, and a controlled fan or blower to force chemically affected flue gas from the second conduit back into the flue, mounted inline in the second conduit.

In an embodiment disclosed, the dry particulate process chemical is an anhydrous metal hydroxide.

In an embodiment disclosed, the anhydrous metal hydroxide is selected from the group consisting of potassium hydroxide, sodium hydroxide, calcium hydroxide, and magnesium hydroxide.

In an embodiment disclosed, the selected anhydrous metal hydroxide is sodium hydroxide, and wherein the sodium hydroxide is caustic beads.

In an embodiment disclosed, the reaction chamber is a drum, and the stirring means is a rotating paddle device and the stirring device is powered by an electric motor with transmission such as gears or pulleys.

In an embodiment disclosed, the heat exchanger comprises a fin or tube type heat exchanger in or next to the second conduit which may include an upper chamber above or within the top portion of the reaction chamber, and the heat carrier material is a suitable fluid.

In an embodiment disclosed, the heat storage means is a buffer or storage tank for receiving heated carrier material which is a fluid; and wherein the apparatus further comprises a pump or blower or fan for circulating the fluid.

In an embodiment disclosed, the fan or blower is controlled to operate a pressure inside the reaction chamber and the first conduit and the second conduit lower than ambient pressure outside the apparatus.

In an embodiment disclosed, the fan or blower is controlled to offset any reduction in convection forces induced by the apparatus or flue gas flow exiting into the first conduit.

In an embodiment disclosed, the apparatus further includes a heat exchanger to heat water or heat air with the stored heat.

In a further aspect, the present disclosure provides a method of capturing $CO_2$ and heat from a flue gas including contacting the flue gas and an anhydrous metal hydroxide, producing a carbonate, $H_2O$, exothermic heat energy, and chemically affected flue gas, wherein the chemically affected flue gas has a decreased $CO_2$ content, storing at least a portion of the exothermic heat energy as stored heat in a heat transfer fluid, and venting the chemically affected flue gas.

In an embodiment disclosed, the method further includes maintaining a chemical reaction or improving the chemical reaction or by mixing the anhydrous metal hydroxide, replenishing the anhydrous metal hydroxide, and extracting the carbonate.

In an embodiment disclosed, the anhydrous metal hydroxide is selected from the group consisting of potassium hydroxide, sodium hydroxide, calcium hydroxide, and magnesium hydroxide.

In an embodiment disclosed, the method further includes heating water or heating air or both with the stored heat.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
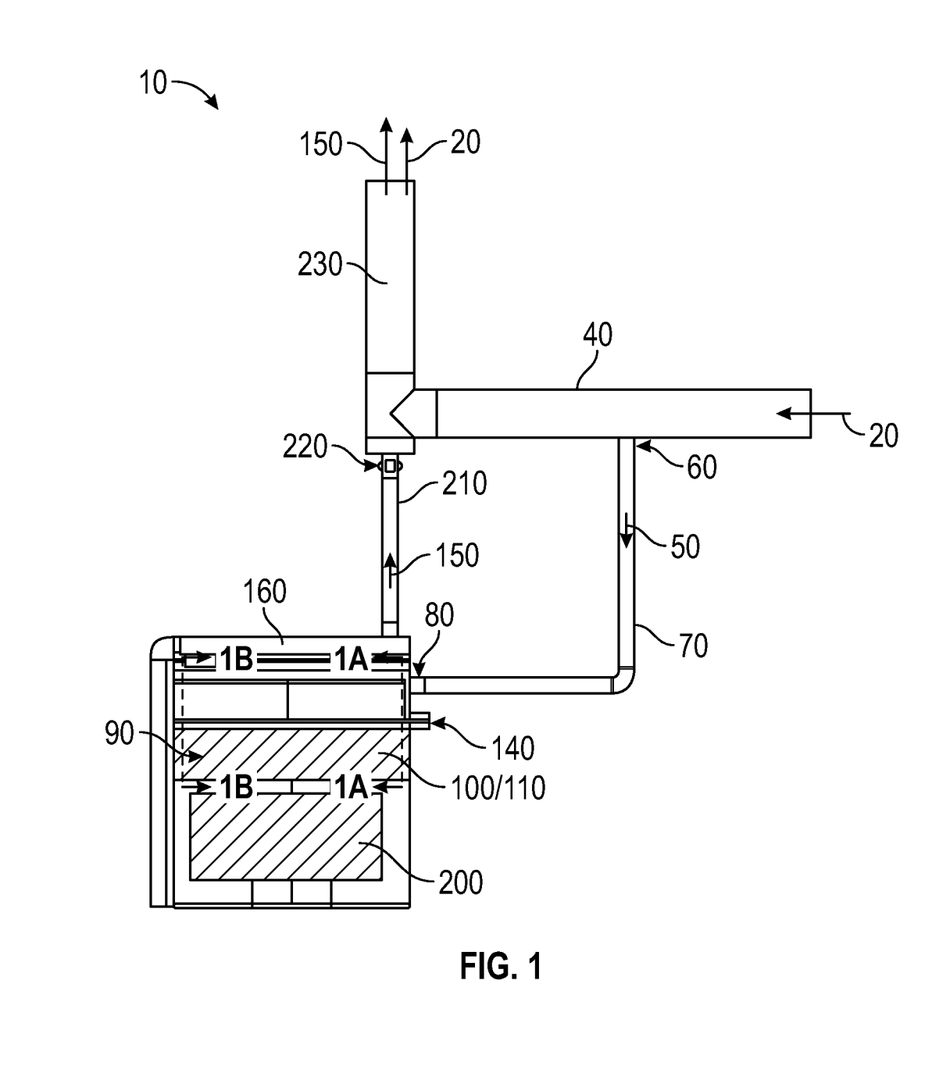
FIG. 1 depicts the components of the system's apparatus in conceptual schematic form.

Referring to FIG. 1, an apparatus 10 of the present disclosure receives flue gases 20 emitted by a fossil fuel fired equipment 30 (see FIG. 4) from a flue 40. The flue gases 20 comprise carbon dioxide and heat. A portion of the flue gases 20 are drawn from the flue 40 into an alternate/side/slip stream, flue gas 50 to be treated by the apparatus 10. A diverter 60 is provided to switchably divert a portion of the flue gas 20 to the apparatus 10 as flue gas 50. A first conduit 70 conveys the flue gas 50 to an inlet 80 of the apparatus 10. In an embodiment disclosed, the apparatus 10 is sized and configured to process about 50 cfm of flue gas.

The apparatus 10 includes a reaction chamber 90 which may include a stainless steel shell. In an embodiment disclosed, the reaction chamber 90 is a horizontal, generally cylindrical, drum.

The reaction chamber 90 contains a quantity of anhydrous metal hydroxide 100. In an embodiment disclosed, the reaction chamber 90, e.g. a drum, is about ⅓ full of hydroxide. The flue gas 50 and the anhydrous metal hydroxide 100 are contacted, e.g. by the flue gas 50 flowing over or through the anhydrous metal hydroxide 100. As $CO_2$ (carbon dioxide) is very dilutive, the gas does not need to pass through the hydroxide for the reaction to occur.

The anhydrous metal hydroxide may be, for example, one or more of potassium hydroxide, sodium hydroxide, calcium hydroxide, and magnesium hydroxide.

The exothermic chemical reaction in the reaction chamber 90, is generally: anhydrous metal hydroxide 100+ $CO_2$=$H_2O$+carbonate 110. The exothermic reaction adds additional heat to the flue gas 50 as it passes through the reaction chamber 90.

If the anhydrous metal hydroxide 100 is NaOH (sodium hydroxide), the carbonate 110 is $Na_2CO_3$ (sodium carbonate) in exothermic reaction: $NaOH+CO_2 \rightarrow H_2+Na_2CO_3$.

If the anhydrous metal hydroxide 100 is KOH (potassium hydroxide), the carbonate 110 is $K_2CO_3$ (potassium carbonate) in exothermic reaction: $2KOH+CO_2 \rightarrow H_2O+K_2CO3$.

If the anhydrous metal hydroxide 100 is $Ca(OH)_2$ (calcium hydroxide), the carbonate 110 is $CaCO_3$ (calcium carbonate) in exothermic reaction: $Ca(OH)_2+CO_2 \rightarrow H_2O+CaCO_3$.

If the anhydrous metal hydroxide 100 is $Mg(OH)_2$ (magnesium hydroxide), the carbonate 110 is $MgCO_3$ (magnesium carbonate) in exothermic reactions: $2Mg(OH)_2+CO_2 \rightarrow Mg_2(OH)_2CO_3+H_2O$ and $Mg_2(OH)_2CO_3+CO_2 \rightarrow 2MgCO_3+H_2O$.

The carbonate 110, for example $Na_2CO_3$ (sodium carbonate, also called soda ash) may be removed/retrieved from the reaction chamber 90 from time to time, for example on a weekly basis. The reaction chamber 90 may also be recharged with new/fresh anhydrous metal hydroxide 100, in this example NaOH (sodium hydroxide/caustic soda), to continue the reaction. The new/fresh anhydrous metal hydroxide 100 may be poured or otherwise conveyed into the reaction chamber 90 via access door 240. The carbonate 110 may be removed via a vacuum system or otherwise conveyed out of the reaction chamber 90, again via access door 240.

Figure 1A:
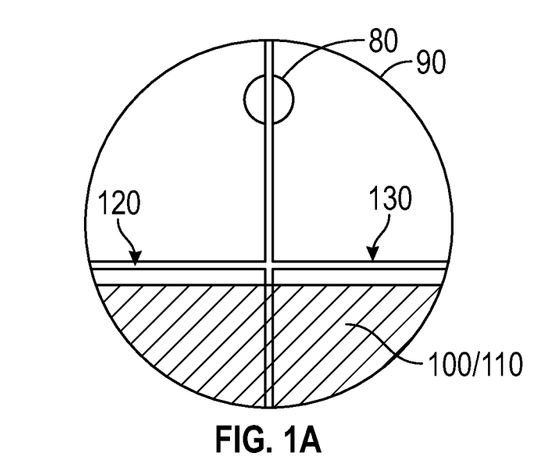
FIG. 1A is a partial cross-section of the reaction chamber of the apparatus of FIG. 1, along section 1A-1A.
Figure 1B:
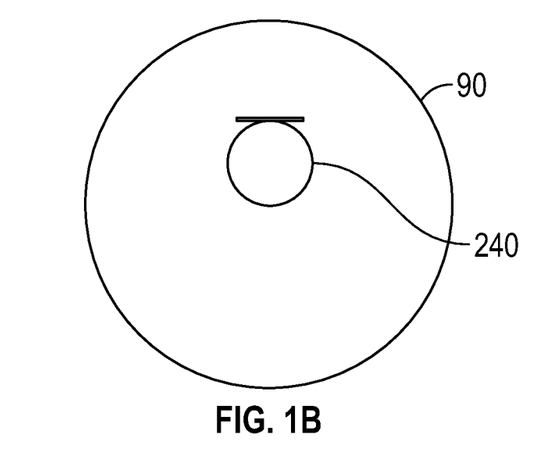
FIG. 1B is a partial cross-section of the reaction chamber of the apparatus of FIG. 1, along section 1B-1B.

The reaction chamber 90 may include an agitator 120, which may include one or more blades 130. The agitator 120 may be driven, for example, by an electric motor 140 to rotate the one or more blades 130. The agitator 120 and/or the one or more blades 130 may be constructed of stainless steel. The anhydrous metal hydroxide 100/carbonate 110 may be agitated for the purpose of maximizing the surface contact area between the $CO_2$ in the flue gas 50 and the anhydrous metal hydroxide 100. In an embodiment disclosed, the agitator 120 is operated when the flue gas 20 is flowing (i.e. when the flue gas 50 is flowing). The agitator 120 in the reaction chamber 90 may consist of a two or four prong blades 130 that rotates inside and along the axis of the reaction chamber 90. The speed may be, for example, varying between 5 to 12 revolutions per minute. The end of the blade 130 is positioned between ¼ and ½ inch away from the wall of the reaction chamber 90 so as to keep the anhydrous metal hydroxide 100 (e.g. caustic) from abrading the walls of the reaction chamber 90. The gap helps reduce the abrasion associated with the agitator 120 rotating in the reaction chamber 90. The end result of the gap is that the carbonate 110, which tends to clump and stick to the walls of the reaction chamber 90, forms a shell of carbonate 110 adhering to the wall of the reaction chamber 90 which prevents erosion of the wall of the reaction chamber 90.

The flue gas 50, having been reacted with the anhydrous metal hydroxide 100 may be referred to as chemically affected flue gas 150. Relative to the flue gas 50, the chemically affected flue gas 150 has a reduced $CO_2$ content and a higher temperature (before heat recovery).

The chemically affected flue gas 150 passes into an upper chamber 160 where a fin or tube type heat exchanger 170 absorbs heat, and the temperature of the chemically affected flue gas 150 is reduced. The heat is added to a buffer or storage tank 200. The buffer or storage tank 200 is located in the apparatus 10 and is designed to store usable heat that can be used to offset energy demands to a hot water heating system, or could be run through a fin or coil type heat exchanger to preheat a given volume of air, for example for domestic, commercial or industrial uses.

The chemically affected flue gas 150 is conveyed back to the flue 40 via a second conduit 210. A fan or blower 220 may be provided in the second conduit 210. The location of the fan or blower 220 serves two purposes: (a) To create a negative pressure in the system so as to reduce the risk of possible flue gases passing into the room that the apparatus 10 is located; and (b) to offset the reduction in convection responsible for creating lift in the chimney 230 drawing the flue gases to the atmosphere and to compensate for the potential issues created from lowering the dew point of the flue gases which could damage the chimney 230.

The combined chemically affected flue gas 150 and the flue gas 20 are vented out the termination point located outside of the building, for example via chimney 230.

The carbonate 110 (e.g. soda ash when the anhydrous metal hydroxide 100 is sodium hydroxide) is a fine granular powder which can be easily and safely transported from the apparatus 10 via an access door 240 located on the flat face of the reaction chamber 90. The fresh anhydrous metal hydroxide 100 (e.g. sodium hydroxide, i.e. caustic) is reloaded through the same access door 240.

Figure 2:
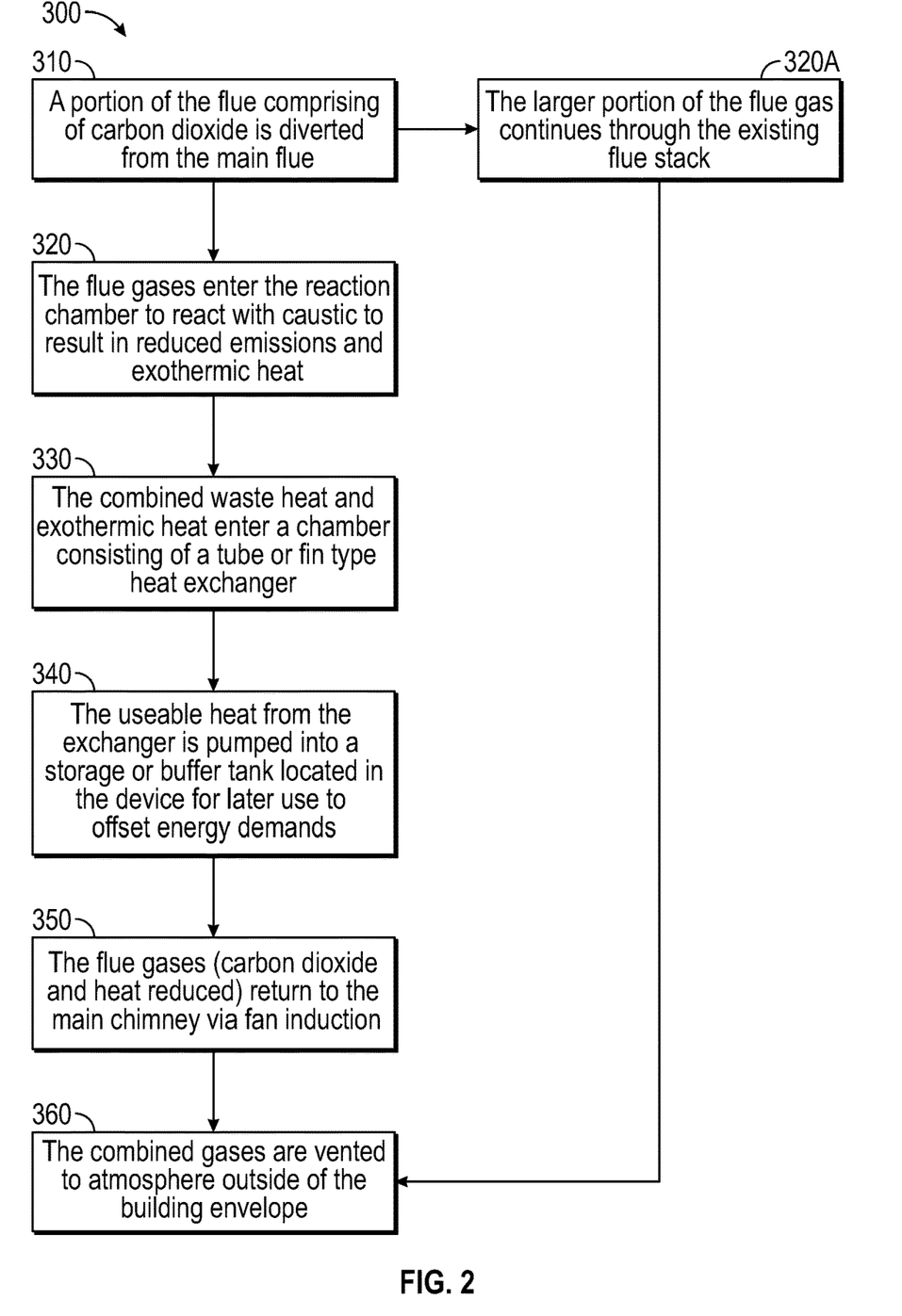
FIG. 2 is a flow diagram of the disclosed processes during operation.

Referring to FIG. 2, a simplified flowchart of the process 300 is provided.

310: A flue gas source containing $CO_2$ is provided, for example, by a heater, a furnace, a boiler, or other equipment or process (e.g. fossil fuel fired equipment 30), and a portion of the flue gas 20, flue gas 50 comprising carbon dioxide ($CO_2$) is diverted from the main flue 40.

320: The flue gas 50 enters the reaction chamber 90 of the apparatus 10 to react with anhydrous metal hydroxide 100 to result in reduced emissions and exothermic heat.

320A: The remaining portion of the flue gas (i.e. flue gas 20 minus flue gas 50) continues through the existing flue 40 to chimney 230.

330: The combined waste heat and exothermic heat enter an upper chamber 160 of the apparatus 10, having a fin or tube type heat exchanger 170.

340: The useable heat from the fin or tube type heat exchanger 170 is pumped into a buffer or storage 200 located in the apparatus 10 for later use to offset energy demands.

350: The chemically affected flue gases 150 (carbon dioxide and heat reduced) return to the flue 40, the flow induced by convection and/or the fan or blower 220.

360: The combined flue gases are vented outside (e.g. outside the building envelope to atmosphere via chimney 230).

Figure 3:
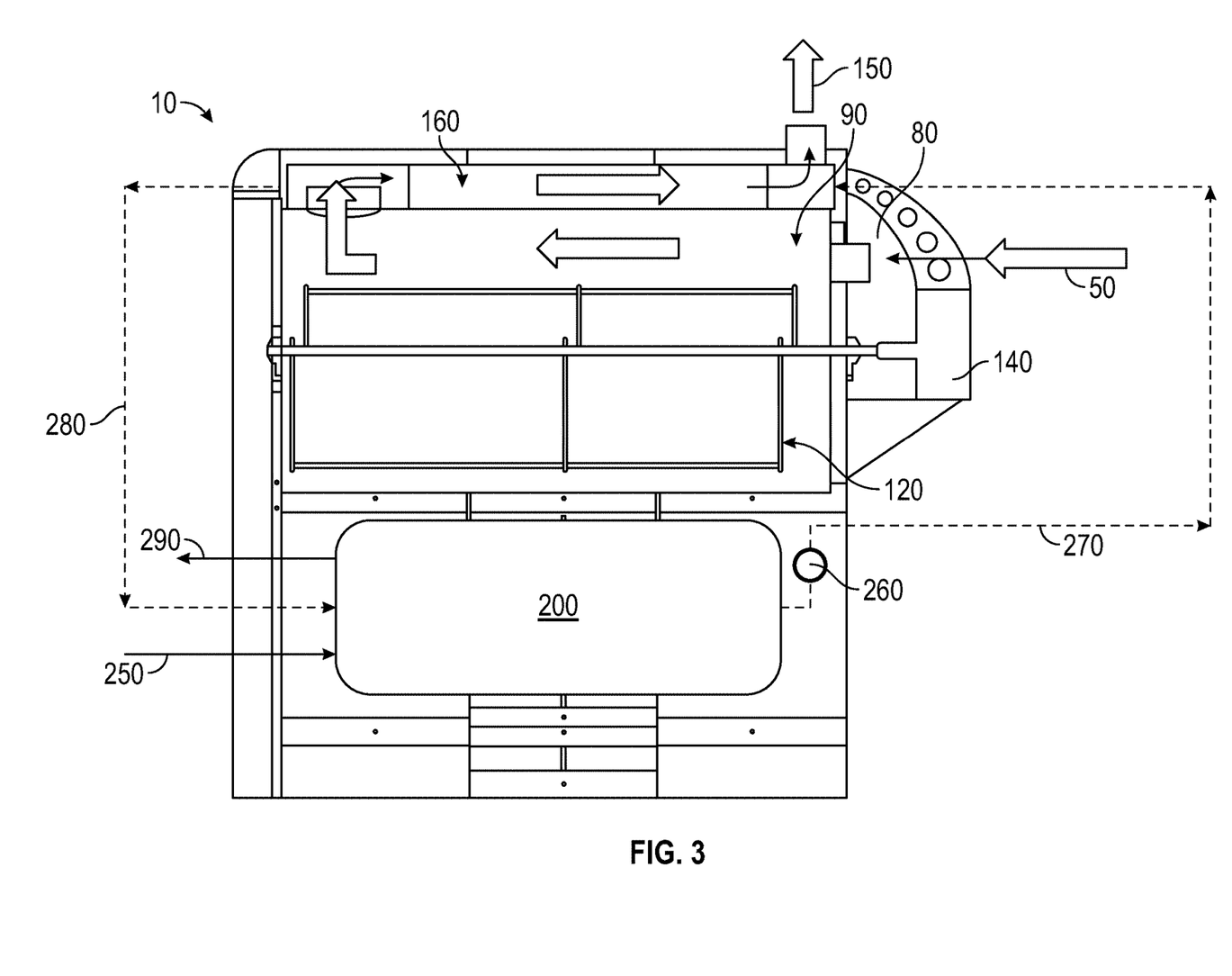
FIG. 3 is a partial cut-away view of the apparatus of FIG. 1.

Referring to FIG. 3 (see also FIG. 1), the flue gas 50 from the fossil fuel fired equipment 30 is drawn through the apparatus 10 by the fan or blower 220. The placement and operation of the fan or blower 220 provides that the system operates under a negative pressure to avoid the potential for flue gas leakage. The apparatus 10 is sealed to ensure that no flue gas 50 (nor chemically affected flue gas 150) may leave the apparatus 10. Further, the apparatus 10 may be interlocked with the fossil fuel fired equipment 30 it is operatively connected with so that the fossil fuel fired equipment 30 cannot operate with the access door 240 on the apparatus 10 in an open position. A switch 550 (see FIG. 6) operatively connected with the access door 240 must be closed to complete the circuit, otherwise the apparatus 10 de-energizes.

The apparatus 10 has a limit switch built into each unit and is designed to shut down should the temperature rise above, for example, 200° F. (93.3° C.). Further, the maximum potential hydronic heat from the apparatus 10 is about 45° C. It is governed by the max flue temperature, the efficiency of the heat recovery and the limit switch built into the unit. Should the input water temperature exceed 45° C., the unit will store the water at temperature until use by the building. Should no hot water be used, the unit will continue to recirculate the water through the system, without risk or damage to the unit until the demand for hot water is needed.

If the reaction chamber 90 is left open, the system will not operate due to the normally open switch 550 operatively connected with the access door 240. This removes the potential for flue gases to exit the system, e.g. enter the mechanical room.

The reaction chamber 90, agitator 120 and associated components may be made of type 304 or 316 stainless steel or other suitable materials. Stainless steel types 304 and 316 can be considered sufficiently corrosion resistant below 80° C., up to the limit of solubility.

In an embodiment disclosed, the fan or blower 220 may provide an air flow of between about 35 to about 55 cfm and providing a static pressure of between about 0.6 to about 0.1 in. W.C.

As mentioned previously, heat from the chemically affected flue gas 150 is extracted in an upper chamber 160 via a fin or tube type heat exchanger 170. The heat may be used to heat a fluid supply 250 to provide a heated fluid supply 290. The fluid supply 250 is directed to the buffer or storage tank 200. A pump 260 circulates a fluid 270 from the buffer or storage tank 200 to the fin or tube type heat exchanger 170, heating the fluid to provide a heated fluid 280, and back to the buffer or storage tank 200. Fluid from the buffer or storage tank 200 may be provided as heated fluid supply 290. The fluid may be, for example, water, air, or a heat transfer fluid such as a mixture of water and glycol.

Figure 4:
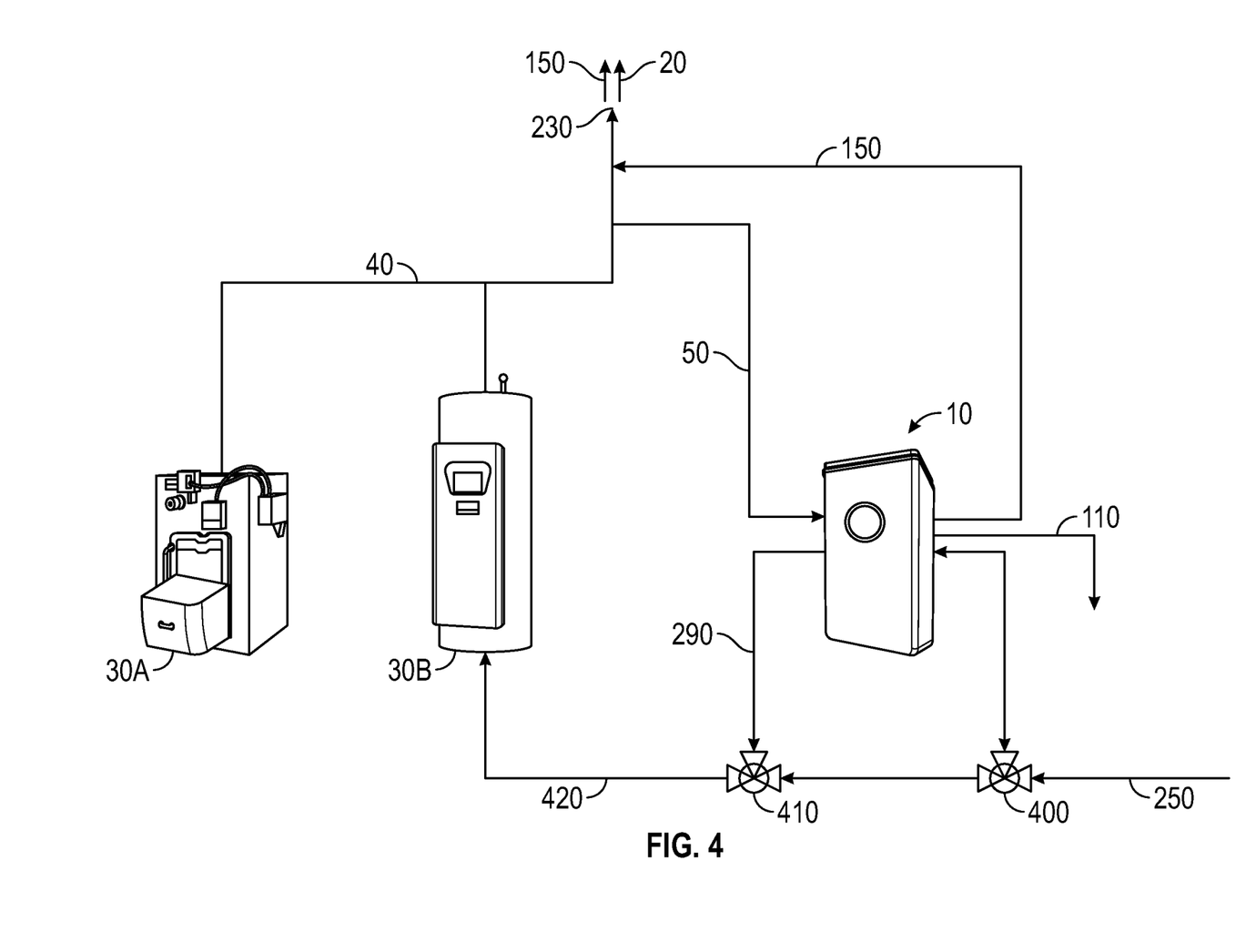
FIG. 4 is a simplified schematic of the apparatus of FIG. 1, in an example installation.

Referring to FIG. 4, apparatus 10 is shown in an example residential or commercial configuration.

One or more fossil fuel fired equipment 30 (heating boiler 30A and domestic hot water tank 30B shown) generate flue gas 20 delivered by flue 40 to chimney 230. A portion of the flue gas 20, flue gas 50 is directed to the apparatus 10 for processing, and treated as described herein, returning chemically affected flue gas 150 to the flue 40 and the chimney 230 (see also FIG. 1). A fluid supply 250 (here a municipal water supply) is directed to the apparatus 10 for heating (with the heat of the flue gas 50 and the chemical reaction in the apparatus 10) to provide a heated fluid supply 290 (here heated municipal water) (see also FIG. 3). A diverter valve 400 and a mixing valve 410 are provided to control the flow and the temperature of a water supply 420 to domestic hot water tank 30B.

Figure 5:
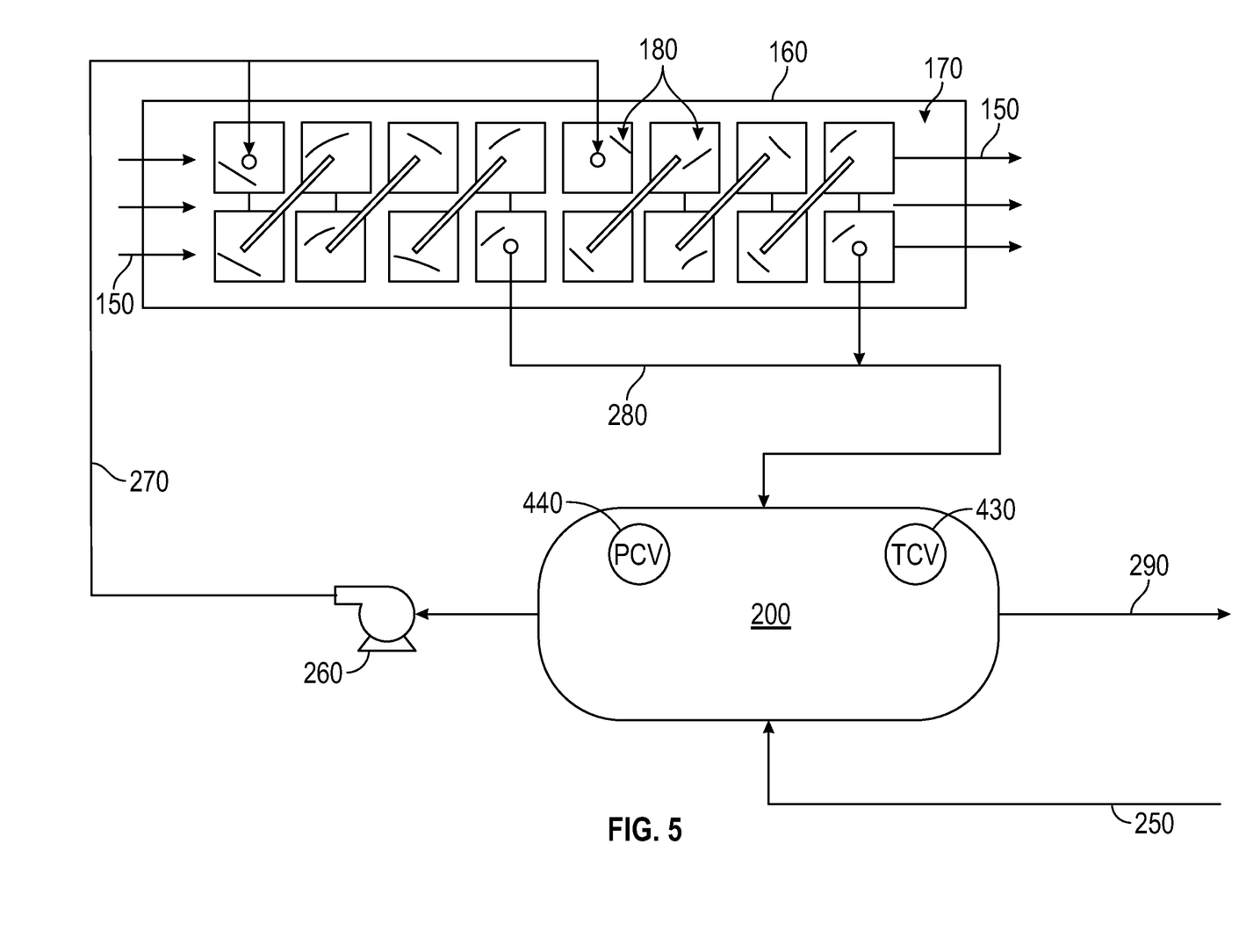
FIG. 5 is a schematic of the heat capture feature of the present disclosure.

Referring to FIG. 5, the chemically affected flue gas 150 is conveyed through the upper chamber 160 of the apparatus 10 to provide heat to the fin or tube type heat exchanger 170. The fin or tube type heat exchanger 170 may have one or more fins 180 to enhance heat transfer. The fan or blower 220 may induce or otherwise convey the chemically affected flue gas 150 (see FIG. 1). A fluid supply 250 is provided to buffer or storage tank 200. The pump 260 circulates fluid 270 to the fin or tube type heat exchanger 170. Heat from the chemically affected flue gas 150 is transferred to the fluid 270 to provide heated fluid 280, and the heated fluid 280 returned to the buffer or storage tank 200. A temperature control valve (TCV) 430 and a pressure control valve (PCV) 440 provide a relief should the buffer or storage tank 200 experience parameters that are greater than its design limits. A heated fluid supply 290 is thus provided.

Figure 6:
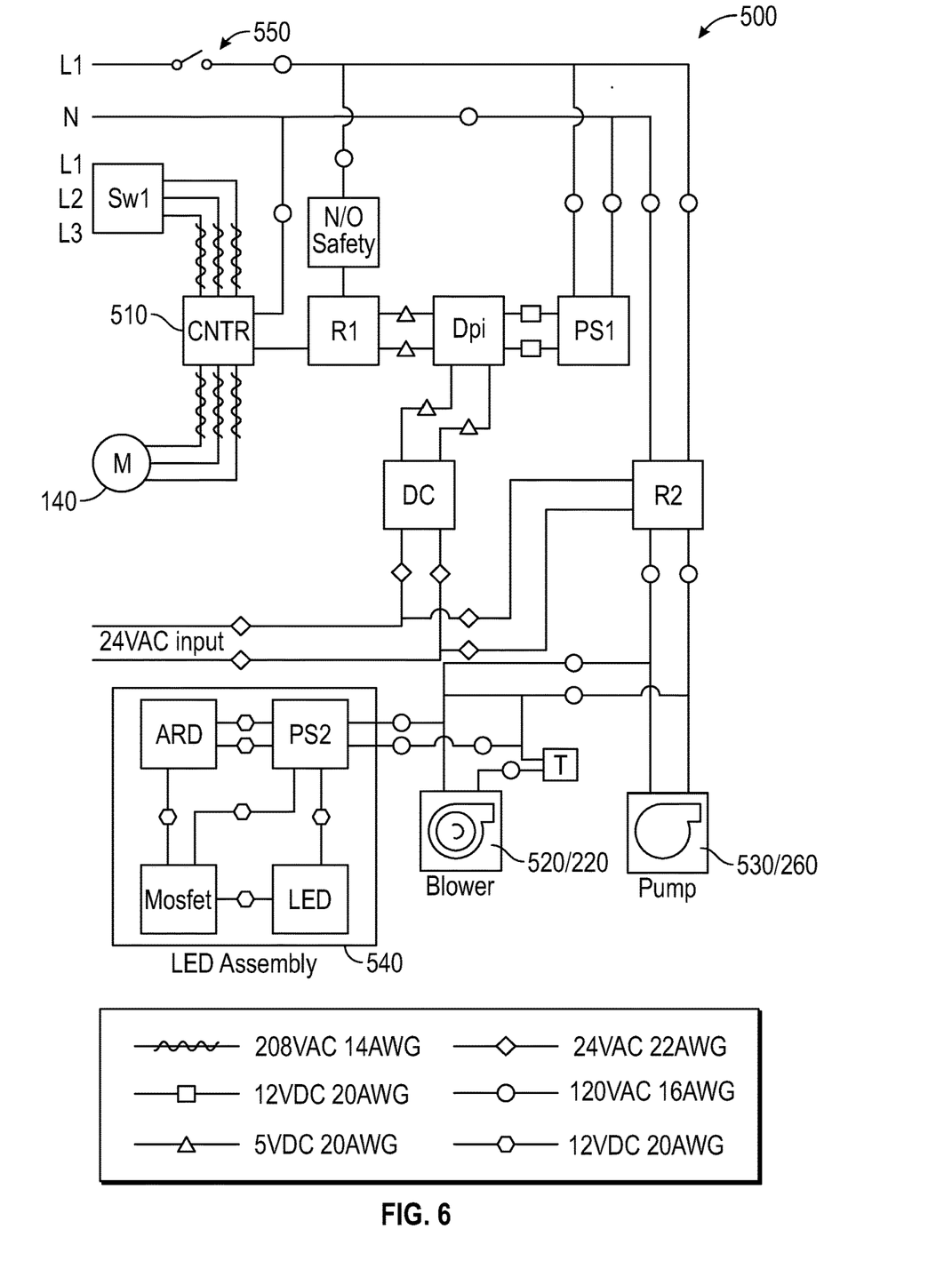
FIG. 6 is a schematic of the control/wiring of the present disclosure.

Referring to FIG. 6, a simplified wiring schematic 500 for apparatus 10 is illustrated. A controller 510 is adapted to control electric motor 140 (for agitator 120), electric motor 520 (for fan or blower 220), electric motor 530 (for pump 260), and/or other aspects of the system. An output 540, such as an light emitting diode (LED) assembly may indicate the status of one or more components. Switch 550 is operatively associated with access door 240 (see FIG. 1), such that access door 240 must be closed to operate the apparatus 10. If the access door 240 is not closed, then switch 550 is open and the system is de-energized and will not operate.

Figure 7:
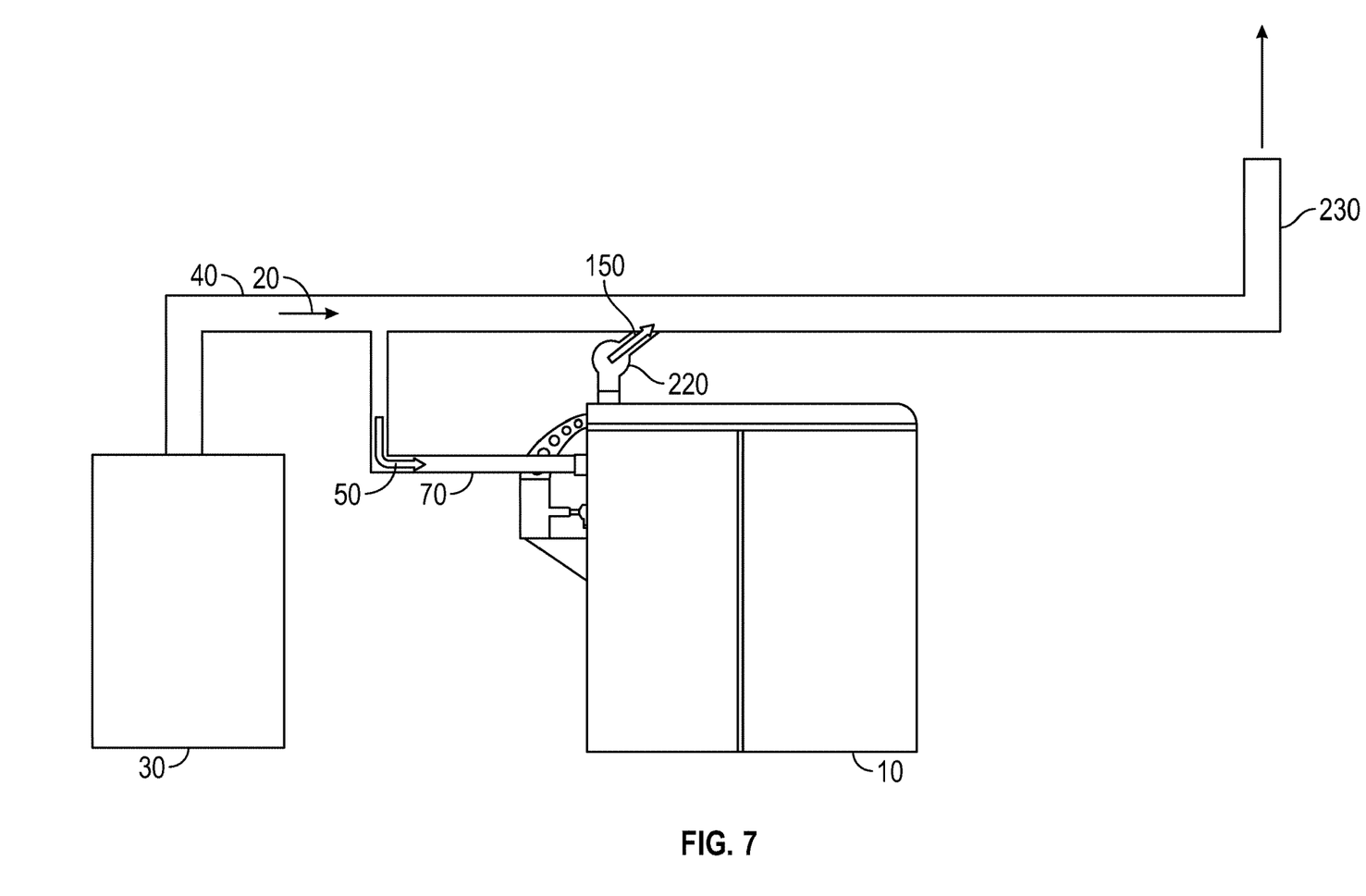
FIG. 7 is a simplified schematic of the apparatus of FIG. 1.

Referring to FIG. 7, fossil fuel fired equipment 30 creates a stream of flue gas 20 which is routed to chimney 230 for venting. Flue gas 50 (at least a portion of the flue gas 20), is directed to the apparatus 10 via first conduit 70 (see also FIGS. 1, 3). The chemically affected flue gas 150 is returned to the flue 40 via second conduit 210. The fan or blower 220, shown inline the second conduit 210, is operated for the purpose(s) and as described herein.

In an embodiment disclosed, the fan or blower 220 may be operated to ensure that the flue 40 and associated chimney 230 draw the flue gas 20 and chemically affected flue gas 150 to atmosphere adequately, as well as to induce flue gas velocity upstream of the second conduit 210 to encourage flue gas with reduced dew point due to energy harvested by the apparatus 10 and moisture added by the chemical processes in the apparatus 10, to exit the chimney 230 without harming the flue 40 or chimney 230 or associated equipment.

The present disclosure has to do with a partial redirection of flue gas from a furnace to capture carbon dioxide effluent from combustion products in the flue gas, using replenishable caustic beads, and capturing heat from an exothermic reaction of the carbon dioxide with the caustic beads for re-use in another system. The present disclosure is directed at heating devices such as natural-gas-fired furnaces in settings where additional heat energy may be beneficial (such as HVAC in a building).

A method and apparatus to capture carbon dioxide from combustion products in a flue gas, using replenishable anhydrous metal hydroxides, and capturing heat from an exothermic reaction of the carbon dioxide with the anhydrous metal hydroxides re-use in another heat using system.

Disclosed embodiments include the following paragraphs, combinations, and permutations thereof.

A carbon dioxide capture and heat recycle apparatus adapted to receive a flue gas containing $CO_2$, the apparatus including a reaction chamber adapted to receive the flue gas, the reaction chamber including a drum to hold a dry particulate process chemical through which the flue gas may be flowed, an agitator to agitate the process chemicals to ensure that the flue gas contacts the surface of the particulate process chemicals, means to insert new particulate process chemicals into the drum, and means to remove spent or old particulate process chemicals from the drum, a heat exchanger to collect heat energy from the reaction chamber in a heat carrier material, and a heat storage means to collect and store heat from the heat carrier material.

The apparatus of paragraph [0085] further including diverter means to switchably divert the flue gas from a flue to the reaction chamber, a first conduit to receive diverted flue gas from the flue, a second conduit to carry chemically affected flue gas from the reaction chamber back to the flue, and a controlled fan or blower to force chemically affected flue gas from the second conduit back into the flue, mounted inline in the second conduit.

The apparatus of paragraphs [0085] to [0086] where the dry particulate process chemical is an anhydrous metal hydroxide.

The apparatus of paragraph [0087], wherein the anhydrous metal hydroxide is selected from the group consisting of potassium hydroxide, sodium hydroxide, calcium hydroxide, and magnesium hydroxide.

The apparatus of paragraphs [0087] to [0088], wherein the selected anhydrous metal hydroxide is sodium hydroxide, and wherein the sodium hydroxide is caustic beads.

The apparatus of paragraphs [0085] to [0089], where the reaction chamber is a drum, and the stirring means is a rotating paddle device and the stirring device is powered by an electric motor with transmission such as gears or pulleys.

The apparatus of paragraphs [0085] to [0090], wherein the heat exchanger comprises a fin or tube type heat exchanger in or next to the second conduit which may include an upper chamber above or within the top portion of the reaction chamber, and the heat carrier material is a suitable fluid.

The apparatus of paragraphs [0085] to [0091], wherein the heat storage means is a buffer or storage tank for receiving heated carrier material which is a fluid; and wherein the apparatus further comprises a pump or blower or fan for circulating the fluid.

The apparatus of paragraphs [0086] to [0092], wherein the fan or blower is controlled to operate a pressure inside the reaction chamber and the first conduit and the second conduit lower than ambient pressure outside the apparatus.

The apparatus of paragraphs [0086] to [0092], wherein the fan or blower is controlled to offset any reduction in convection forces induced by the apparatus or flue gas flow exiting into the first conduit.

The apparatus of paragraphs [0085] to [0094], further comprising a heat exchanger to heat water or heat air with the stored heat.

A method of capturing $CO_2$ and heat from a flue gas including contacting the flue gas and an anhydrous metal hydroxide, producing a carbonate, $H_2O$, exothermic heat energy, and chemically affected flue gas, wherein the chemically affected flue gas has a decreased $CO_2$ content, storing at least a portion of the exothermic heat energy as stored heat in a heat transfer fluid, and venting the chemically affected flue gas.

The method of paragraph [0096], further comprising maintaining a chemical reaction or improving the chemical reaction or by mixing the anhydrous metal hydroxide, replenishing the anhydrous metal hydroxide, extracting the carbonate, or combinations thereof.

The method of paragraphs [0096] to [0097], wherein the anhydrous metal hydroxide is selected from the group consisting of potassium hydroxide, sodium hydroxide, calcium hydroxide, and magnesium hydroxide.

The method of paragraphs [0096] to [0098], further comprising heating water or heating air or both with the stored heat.

A system and/or an apparatus adapted to provide the method of any one of paragraphs [0096] to [0099] or otherwise disclosed herein.

The herein-described embodiments are intended to be examples only. Alterations, modifications and variations can be affected to the particular embodiments by those of skill in the art. The scope of the claims should not be limited by the particular embodiments set forth herein, but should be construed in a manner consistent with the specification as a whole.

The invention claimed is:

1. A carbon dioxide capture and heat recycle apparatus adapted to receive a flue gas containing $CO_2$, the apparatus comprising:
   a reaction chamber adapted to receive the flue gas, the reaction chamber comprising:
   i. a drum to hold a dry particulate process chemical through which the flue gas may be flowed;
   ii. an agitator to agitate the process chemicals to ensure that the flue gas contacts the surface of the particulate process chemicals;
   iii. means to insert new particulate process chemicals into the drum, and means to remove spent or old particulate process chemicals from the drum;
   a heat exchanger to collect heat energy from the reaction chamber in a heat carrier material; and
   a heat storage means to collect and store heat from the heat carrier material.

2. The apparatus of claim 1, further comprising:
   diverter means to switchably divert the flue gas from a flue to the reaction chamber;
   a first conduit to receive diverted flue gas from the flue;
   a second conduit to carry chemically affected flue gas from the reaction chamber back to the flue; and
   a controlled fan or blower to force chemically affected flue gas from the second conduit back into the flue, mounted inline in the second conduit.

3. The apparatus of claim 1, where the dry particulate process chemical is an anhydrous metal hydroxide.

4. The apparatus of claim 3, wherein the anhydrous metal hydroxide is selected from the group consisting of potassium hydroxide, sodium hydroxide, calcium hydroxide, and magnesium hydroxide.

5. The apparatus of claim 4, wherein the selected anhydrous metal hydroxide is sodium hydroxide, and wherein the sodium hydroxide is caustic beads.

6. The apparatus of claim 1, where the reaction chamber is a drum, and the stirring means is a rotating paddle device and the stirring device is powered by an electric motor with transmission such as gears or pulleys.

7. The apparatus of claim 2, wherein the heat exchanger comprises a fin or tube type heat exchanger in or next to the second conduit which may include an upper chamber above or within the top portion of the reaction chamber, and the heat carrier material is a suitable fluid.

8. The apparatus of claim 1, wherein the heat storage means is a buffer or storage tank for receiving heated carrier material which is a fluid; and wherein the apparatus further comprises a pump or blower or fan for circulating the fluid.

9. The apparatus of claim 2, wherein the fan or blower is controlled to operate a pressure inside the reaction chamber and the first conduit and the second conduit lower than ambient pressure outside the apparatus.

10. The apparatus of claim 2, wherein the fan or blower is controlled to offset any reduction in convection forces induced by the apparatus or flue gas flow exiting into the first conduit.

11. The apparatus of claim 1, further comprising a heat exchanger to heat water or heat air with the stored heat.

\* \* \* \* \*